Jan. 26, 1965 J. MIQUEL ETAL 3,167,673
ROTARY ELECTRO-MAGNETIC MACHINE
Filed March 8, 1961 2 Sheets-Sheet 1

Inventors
Joseph Miquel
Jean Grange
Elie Cazal
By
Stevens Davis Miller & Mosher
Attorneys Inventor
Joseph Miquel
Jean Grange
Elie Cazal By Stevens Davis Miller & Mosher Attorneys

United States Patent Office 3,167,673
Patented Jan. 26, 1965

1

3,167,673
ROTARY ELECTRO-MAGNETIC MACHINE
Joseph Miquel, Jean Grange, and Elie Cazal, all of
11 Rue Gandon, Paris 13, France
Filed Mar. 8, 1961, Ser. No. 94,255
Claims priority, application France, Mar. 10, 1960,
820,873, Patent 1,258,970
10 Claims. (Cl. 310—93)

The present invention relates to a new or improved rotary electro-magnetic machine capable of being used as a clutch, a torque variator or a brake, such devices being possibly combinable into one and the same machine.

The improved rotary machine according to the invention comprises, in its simplest form, an electro-magnet coil or winding which may be either stationary or revoluble, and a rotary carrier made of a non-magnetic material operatively connected to a shaft journalled along the geometrical axis of the electro-magnet, said carrier having at least one axle extending between the electro-magnet poles and upon which is mounted for idle rotation an annular core made of a magnetic material whose face directed toward the electro-magnet is coated with a film of diamagnetic lubricating substance.

Where the electro-magnet is revolubly mounted, it may be fast with a rotary shaft, the electric current being fed to the coil for example by means of slip rings. In this embodiment of the invention, the energization of the coil provides an angular coupling between the two shafts of the electro-magnet and carrier, whereby the machine operates as a clutch or torque variator depending upon the degree of energization of the coil.

Where, on the contrary, the electro-magnet is stationary, the energization of the coil has a tendency to hold the carrier motionless with respect to said stationary electro-magnet, whereby the machine then operates as a brake.

By combining a movable electro-magnet and a stationary electro-magnet with a carrier provided with at least one annular magnetic core-receiving axle on each of its sides, a machine is provided which is capable of operating both as a clutch and as a brake, whereby properly adjusted feed (e.g. a differential feed for the two coils) permits the machine to operate as a speed variator.

According to a possible constructional modification, a clutch may be also provided by means of a stationary electro-magnet by interposing between said electro-magnet and the non-magnetic carrier supporting the annular core or cores a plate keyed to or made fast with a rotary shaft which must be coupled for joint angular motion with the carrier shaft.

As the coil or winding of an electro-magnet is energized, North and South poles are provided in it as is well known, whereby the annular magnetic cores are also energized in their portions facing said poles. This creates a polarization of said cores which, owing to their revoluble fitting upon the carrier axles, are angularly moved owing to this polarization. This angular motion takes place as long as the electro-magnet and the cores are not entirely "stuck" together, i.e. as long as there is no coupling for joint angular motion between the electro-magnet and the carrier-supporting shaft. Rotation of the annular cores constantly renews the film of lubricant between the same and the electro-magnet, thereby doing away with mechanical friction and other detrimental effects interfering with proper running conditions of the machine. There follows at the same time a more rational ventilation which staves off any undue overheating of the machine during its operation and any magnetic remanence when the coil-energizing circuit is cut off.

The self-lubricated gap or interval provided by the lubricant film between the electro-magnet and the annular cores (lubrication being performed by the aforesaid film) may be extremely narrow so as to provide what may be termed a "micro-gap," whereby the utmost advantage may be taken of the magnetic energy. Moreover the particular arrangement eliminates induction influences and permits the machine to operate with a mere inductor, i.e. in purely electro-magnetic fashion.

The lubricant which is used may be for example molybdenum bisulphide or a combination of silver and molybdenum bisulphide or any other equivalent dry self lubricating material.

Owing to the fact that the machine comprises a single inductor (or two or more inductors when dealing with a combined machine capable of behaving as a clutch-torque variator-brake) use may be made for controlling the same of highly simplified electronic circuits while securing the operational characteristics that are usually obtained with motors fed by direct current. This result is obtained, furthermore, by the fact that the power to be controlled is, in the machine according to the invention, extremely small so that for controlling purposes semi-conductors may be used which are equally adaptable to open loop systems and to closed loop systems. In the latter case, a satisfactory operational stability is obtained in a large number of electronic appliances for speed control and torque control, also a safer response to quick signals than in conventional systems without any need to resort to complicated devices for stabilizing the circuits, thereby avoiding self oscillations which often cause a bad response to swift signals.

In order that the invention may be more easily understood and carried into practice, it will be now described more in detail with reference to the accompanying diagrammatic drawings exemplifying the same and forming a part of the present disclosure.

Figure 1:
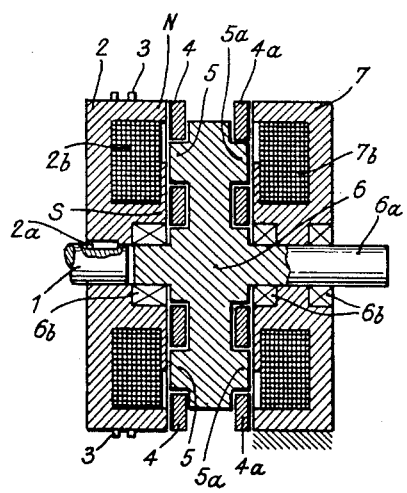
FIGURE 1 is a diametrical sectional view of a machine embodying the invention.
Figure 2:
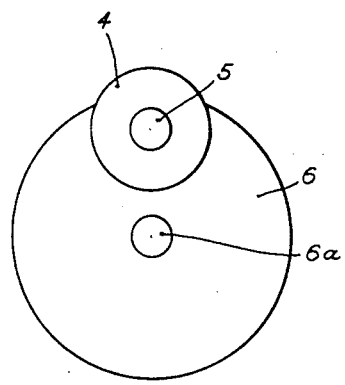
FIGURE 2 is a front view of the plate operatively connected to the driven shaft.

In the constructional form shown in FIGS. 1 and 2, the shaft 1 which may be driven by any prime mover carries an electro-magnet 2 keyed to said shaft as shown at 2a. The coil or winding 2b of this electro-magnet is fed through slip rings 3. This machine also includes a stationary electro-magnet 7 whose coil is shown at 7b.

A carrier 6 made of a non-magnetic material is coupled for joint angular motion with a shaft 6a which may be the driven shaft of the served contrivance or which may be connected to said shaft. The shaft 6a is journalled in the yokes of the electro-magnets 2, 7 through ball, roller or like bearings 6b. The carrier 6 may be made for example of a suitable plastic. In the constructional form as shown, it is assumed to be cast integral with the driven shaft 6a.

The carrier 6 is provided between the poles of the electro-magnets 2, 7 with axles or arbors 5, 5a. Said axles 5 are directed toward the electro-magnet 2 while the axles 5a are directed toward the electro-magnet 7. The purpose of said axles is revolubly to carry annular cores 4, 4a, made of a magnetic material. As is clearly visible in FIG. 1, parts of each core face the North and South poles provided in the yoke of each electro-magnet owing to the energization of its coil. Depending upon the power to be derived from a given electro-magnet one or several axles such as 5, 5a may be used, also one or several annular cores such as 4, 4a. Only one axle and one core appear in the showing of FIG. 2.

In the constructional form shown in FIG. 1, the magnetic cores 4, 4a are solid cores which are so fitted as to be free for idle rotation on the axles 5, 5a, the size of said axles and of said cores being so reckoned as to permit a slight axial shift of the cores on the axles so as to eliminate any undue mechanical friction when the associated electro-magnet is in inoperative condition. However such an axial shift will be preferably held down to a small value so as to avoid those shocks and impacts that are detrimental to proper behaviour of the materials as the energization takes place.

The solid cores 4, 4a may have any desired composition provided they have magnetic properties, and they are coated on their face directed toward the associated electro-magnet with a very thin film of a lubricating material, for example molybdenum bisulphide of diamagnetic character.

The solid cores that are shown might be replaced if required by any suitable type of bearings capable of fulfilling owing to their magnetic nature a function equivalent to that of the cores, i.e. of providing proper magnetic flux path as generated by the energization of the coil of each electro-magnet.

The operation of the machine takes place as follows: Attention will be first focussed on the operation of that part of the machine adapted to behave as a clutch and torque variator. Upon the coil 2b of the electro-magnet 2 being energized, a magnetic flux is generated through the yoke of said electro-magnet, as indicated in the foregoing, by providing North and South poles, whereupon the magnetic circuit is achieved through each core 4 which then undergoes polarization through the extremely narrow gap formed by the lubricant film. The production of North and South poles in those parts of the cores 4 which face toward the North and South poles on the yoke means that the cores 4 are rotated about their axles 5 while at the same time there is produced an electro-magnetic pull through the lubricant film carried by said cores. It will be understood that said core rotation continuously renews the lubricant film while lessening mechanical friction. This magnetic pull provides a coupling for joint angular motion between the shaft 1 and the carrier 6 owing to the torque resulting from the driving action performed by the annular cores 4 upon the eccentric axles 5 of the carrier. The degree of energization of the coil 2b sets the intensity of the resultant magnetic pull or attraction and, depending upon the resistant torque applied to the shaft 6a, the degree of slippage between the electro-magnet 2 and the carrier 6, whereby this part of the machine operates as a torque variator. The cores 4 continue to revolve until the cores are entirely "stuck" against the electro-magnet yoke.

The other part of the machine which includes the stationary electro-magnet 7 operates as a brake. The operation is similar to the one described hereinbefore in connection with the clutch part of the machine. The braking action may be more or less rapid depending upon the degree of energization of the coil 7b.

If desired, a spring may be interposed between the cores 4, 4a and the carrier 6. The purpose of this spring is to maintain the lubricated faces of the cores in true parallelism with respect to the electro-magnets. Flat or leaf springs or spiral or similarly shaped springs may be provided for fostering constant pressure exertion and ensuring a properly parallel bearing of the contacting surfaces.

The carrier may be suitably made of any adequate metal, alloy or plastic and advantageously possesses such a strength as to provide an adequate safety margin for taking those strains to which it is subjected.

Figure 3:
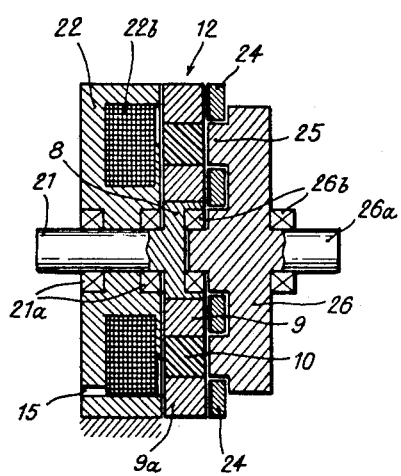
FIGURE 3 is a diametrical sectional view of a constructional modification of the machine.
Figure 4:
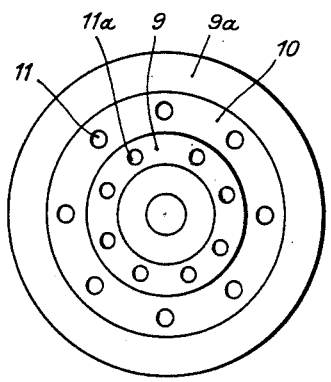
FIGURE 4 is a front view of a polarized plate as used in the machine shown in FIG. 3.

In the showing of FIGS. 3 and 4 is represented a machine adapted to operate as a clutch and including a stationary electro-magnet. In this constructional form, the driving shaft 21 is journalled through bearings 21a in the electro-magnet 22 which is stationary and has a coil 22b fed through an aperture 15. At its end the driving shaft 21 has a portion 8 of larger diameter which is coupled for joint angular motion with a polarized plate designated generally by 12. A carrier 26 made of a non-magnetic material and similar to the one shown by FIGS. 1 and 2 is connected for joint angular motion with the driven shaft 26a, said carrier being centered by ball, roller or like bearings 26b. The carrier 26 has eccentric axles 25 for fitting of rotary annular cores 24 as in the previous constructional form.

As can be seen in FIGS. 3 and 4, the polarized plate 12 has an inner magnetic crown or ring portion 9, an outer magnetic crown or ring portion 9a and an intermediate non-magnetic crown or ring portion 10. Apertures 11, 11a are provided in the ring portions 9 and 10 as shown in FIG. 4 in order to improve cooling.

As the coil 22b is energized, North and South poles are generated in the polarized plate 12 and, as in the previous constructional form, there follows a magnetic pull or attraction of the cores 24 through the gap represented by the lubricant film which coats their face directed toward the plate 12. Polarization of the cores 24 causes rotation thereof, the results being similar to those described in respect of the machine shown in FIGS. 1 and 2.

Obviously there may be associated with the other face of the carrier 26 an electro-magnet and cores for providing a brake. Springs as indicated in the foregoing may be also incorporated with this arrangement.

The electro-magnets whether stationary or revoluble may comprise two or more pairs of concentric or alternated poles.

As indicated hereinbefore, the power to be controlled as the coils of the electro-magnets of machines according to the invention are fed is very small. Thus in the case of a machine operating as a torque variator, the power to be controlled is smaller than 1/10 watt per H.P. while it is equal as an average to one kilowatt per H.P. in conventional systems including a direct current motor. This small controlling power permits inter alia the use of highly simplified electronic control devices including semiconductors.

Figure 5:
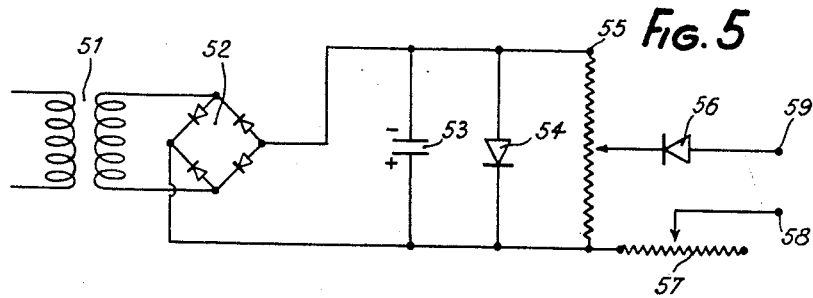
FIGURES 5, 6 and 7 are views showing three electronic systems utilizable for the control of a machine according to the invention.

In the showing of FIG. 5, there is illustrated a control system utilizable with an alternating current feed. This system includes a transformer 51 connected to a rectifying bridge 52. Rectified current is sent to the terminals of a potentiometer 55 through a circuit portion comprising a filtering condenser 53 and a Zener diode 54 acting as a voltage regulator. The potentiometer 55 permits the overall operating intensity to be adjusted and is connected to the output terminals 58, 59 of the circuit through a Zener diode 56 which limits the current intensity and a rheostat 57 which permits the speed to be progressively adjusted.

Figure 6:
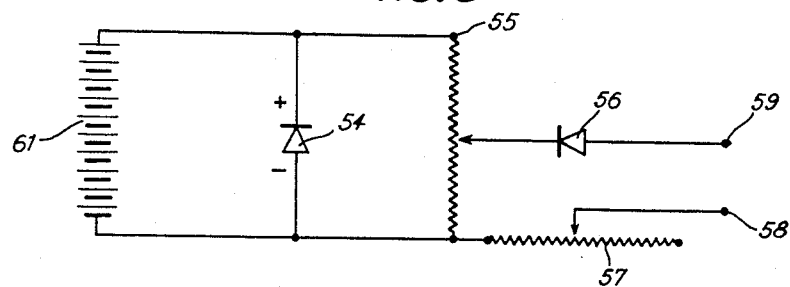

The system shown in FIG. 6 is similar to the one shown in FIG. 5 and equivalent elements are designated by the same reference numerals. However the feed is ensured in this modified form by a battery 61. The filtering condenser 53 may be done away with. In the case of a feed by dynamo, the filtering condenser should be, however, retained.

Figure 7:
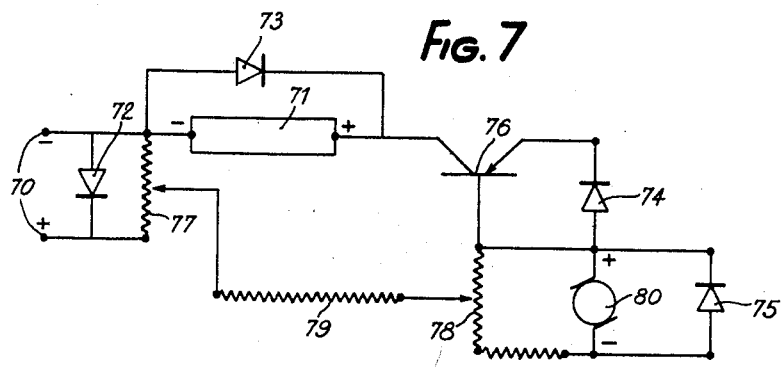

In the showing of FIG. 7, there is illustrated a system permitting a highly accurate adjustment to be achieved. The feed terminals are shown at 70 and the load circuit is designated by 71. In this diagram, the references 72, 73, 74, 75 designate Zener diodes forming regulators. The reference 76 designates a transistor matching the power to be controlled; 77, 78 designate a pair of adjusting potentiometers which may be interconnected; 79 designates a stationary resistor, and 80 designates a tachometer dynamo.

Other arrangements still are conceivable for the controls to be achieved. The chief feature of said arrangements is the concomitant adjustment of current voltage and intensity owing to the provision of Zener diodes or other semi-conductors fulfilling the same functions.

Figure 8:
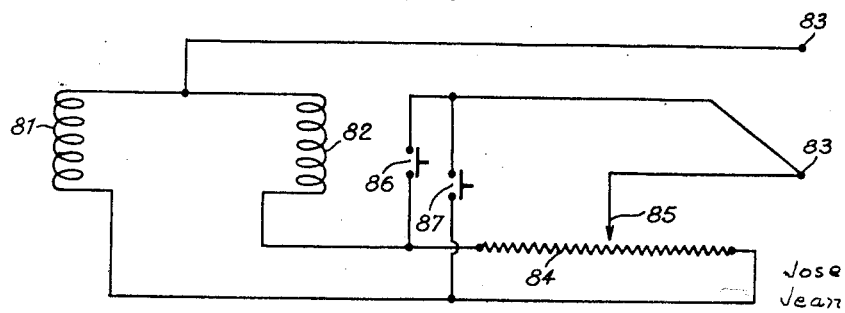
FIGURE 8 is a view showing a circuit whereby differential energization of the coils may be obtained in a machine adapted to operate as a clutch and brake.

In the case of a machine constituting a combined clutch, torque variator and brake, use may be made of a very simple simultaneous potentiometer control of the type shown in FIG. 8. This control device permits the speed and the braking action to be simultaneously controlled.

The machine coils or windings in FIG. 8 are represented in diagrammatic fashion at 81 and 82; they are connected in parallel between one of the feed terminals 83 and the terminals of an adjustment potentiometer 84 whose runner 85 is connected to the other feed terminal 83. Motion of this runner 85 permits the differential feed of the electromagnets and consequently the degree of slippage to be adjusted whereby any desired speed may be obtained between a maximum speed corresponding to the rotational speed of the driving shaft and a complete braking effect. Pushbuttons 86, 87 are so mounted as to be able to short-circuit the potentiometer 84 so as to permit a direct feed of either the one or the other of the coils 81, 82 with impulses, thereby achieving a drive at top speed or a rapid braking action.

The machine cores may have any suitable geometrical shape but they are preferably cylindrical. Such cores may be made of any magnetic material. A satisfactory technical solution consists in using cores made of sintered or conglomerated iron or alloy possessing appropriate perviousness and capable of ensuring the required self-lubricating effect. Such cores may be so directly treated as to facilitate this self lubricating effect. If desired, the bearing surfaces of the electro-magnets may undergo similar treatments.

A machine of the type according to the invention lends itself to a wide range of uses. It may operate as a torque variator and transmitter, as a speed variator, as a clutch and finally as a slow or quick acting brake. It may be adapted to all electro-mechanical structures, for example to driving or jacking or hoisting contrivances, to machine tools, to printing presses, etc. wherever an accurate speed adjustment and a selectively adjustable responding capacity are required both for varying the torque or speed and for altering the operating speed. The small overall size of the machine and the limited quantity of electric current consumed by the machine with respect to the transmitted power render the machine still more attractive.

Minor constructional details may be varied within the field of technical equivalents without departing from the scope of the appended claims.

We claim:

1. A rotary electro-magnetic machine comprising an annular electro-magnet, a shaft, means journalling said electro-magnet along its geometrical axis to said shaft, a carrier of non-magnetic material co-axial with said electro-magnet, means coupling said carrier for joint angular rotation with said shaft, at least one axle extending eccentrically from said carrier and directed between the poles of said electro-magnet, an annular magnetic core mounted for idle rotation on said axle and having a face directed towards said electro-magnet, and a film of diamagnetic lubricating substance coating said face.

2. A rotary electro-magnetic machine comprising an annular electro-magnet, a driving shaft, means keying said electro-magnet to said driving shaft, a second shaft, means journalling said electro-magnet along its geometrical axis to said second shaft, a carrier of non-magnetic material co-axial with said electro-magnet, means coupling said carrier for joint angular rotation with said second shaft, at least one axle extending eccentrically from said carrier and directed between the poles of said electro-magnet, an annular magnetic core mounted for idle rotation on said axle and having a face directed towards said electro-magnet, and a film of diamagnetic lubricating substance coating said face.

3. A rotary electro-magnetic machine comprising a stationary annular electro-magnet, a driving shaft, means journalling said driving shaft in said electro-magnet about the geometrical axis of the latter, a second shaft, means journalling said electro-magnet along its geometrical axis to said second shaft, a carrier of non-magnetic material co-axial with said electro-magnet, means coupling said carrier for joint angular rotation with said second shaft, an annular polarized plate located intermediate said electro-magnet and said carrier, means coupling said plate with said driving shaft for joint angular rotation, at least one axle extending eccentrically from said carrier and directed between the poles of said electro-magnet, an annular magnetic core mounted for idle rotation on said axle and having a face directed towards said polarized plate, and a film of diamagnetic lubricating substance coating said face.

4. A rotary electro-magnet as set forth in claim 3, said polarized plate comprising inner, intermediate and outer rings, said intermediate ring being of non-magnetic material, and said inner and outer rings being of magnetic material and being situated in front of the poles of said electro-magnet.

5. A rotary electro-magnetic machine comprising first and second annular and co-axial electro-magnets each having a yoke and a coil, a driving shaft, means rendering said first electro-magnet fast with said driving shaft, a second shaft, means journalling said second shaft in said yokes of said first and second electro-magnets, a non-magnetic carrier co-axial with and disposed between said electro-magnets, said carrier having two faces, each said face being opposed to one of said electro-magnets, means coupling said carrier for joint rotation with said second shaft, at least one axle extending eccentrically from said each said face of carrier and directed between the poles of said one of said electro-magnets opposed to said each said face, an annular magnetic core mounted for idle rotation on each said at least one axle and having a face directed towards said one of said electro-magnets, and a film of diamagnetic lubricating substance coating each said core face.

6. A rotary electro-magnetic machine comprising first and second annular and co-axial electro-magnets each having a yoke and a coil, first and second co-axial and axially-separate shafts, means journalling said first and second electro-magnets along their geometrical axes respectively to said first and second shafts, an annular polarized plate co-axial with and interposed between said electro-magnets, said polarized plate being fast with said first shaft, an annular carrier of non-magnetic material co-axial with said electro-magnets and said polarized plate and interposed between said polarized plate and said second electro-magnet, said carrier being fast with said second shaft and having two faces, one said face being opposed to said polarized plate and the other said face being opposed to said second electro-magnet, at least one axle extending eccentrically from each of the two faces of said carrier and directed between the poles of the opposed electro-magnet, an annular magnetic core mounted for idle rotation on each said axle and having a face directed towards said opposed electro-magnet, and a film of diamagnetic lubricating substance coating each said core face.

7. A rotary electro-magnetic machine as set forth in claim 1, in which said core comprises conglomerated magnetic powder, and at least said face thereof has been given self-lubricating properties.

8. A rotary electro-magnetic machine as set forth in claim 1, in which said core comprises sintered magnetic powder and at least said face thereof has been given self-lubricating properties.

9. A rotary electro-magnetic machine as set forth in claim 2, in which said film is of molybdenum disulphide.

10. A rotary electro-magnetic machine as set forth in claim 2, in which said film is of a combination of silver and molybdenum disulphide.

References Cited in the file of this patent

UNITED STATES PATENTS

| | | |
|---|---|---|
| 1,519,417 | Payne | Dec. 16, 1924 |
| 1,622,261 | Payne | Mar. 22, 1927 |
| 2,039,590 | Freeborn | May 5, 1936 |
| 2,560,868 | Hubert | July 7, 1951 |